US012438304B2

(12) United States Patent
Stack

(10) Patent No.: US 12,438,304 B2
(45) Date of Patent: Oct. 7, 2025

(54) HOUSING OF AN ELECTRICAL CONNECTOR

(71) Applicant: TE Connectivity Solutions GmbH, Schaffhausen (CH)

(72) Inventor: Daniel Stack, Winston Salem, NC (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 418 days.

(21) Appl. No.: 18/048,500

(22) Filed: Oct. 21, 2022

(65) Prior Publication Data

US 2024/0136762 A1 Apr. 25, 2024
US 2024/0235111 A9 Jul. 11, 2024

(51) Int. Cl.
*H01R 13/627* (2006.01)
*H01R 13/50* (2006.01)
*H01R 103/00* (2006.01)

(52) U.S. Cl.
CPC ......... *H01R 13/6272* (2013.01); *H01R 13/50* (2013.01); *H01R 2103/00* (2013.01)

(58) Field of Classification Search
CPC ................ H01R 13/6272; H01R 13/50; H01R 13/6271; H01R 13/6277; H01R 13/422–4226; H01R 2103/00
USPC .................................................. 439/352, 744
See application file for complete search history.

(56) References Cited

U.S. PATENT DOCUMENTS 3,165,369 A * 1/1965 Maston ................ H01R 13/424 439/744
4,386,816 A * 6/1983 Frear .................... H01R 13/424 439/744
4,632,482 A * 12/1986 Punako ................ H01R 13/187 439/744
4,636,020 A * 1/1987 Marmillion ........ H01R 13/4226 439/873
5,118,303 A * 6/1992 LeBaron ................ H01R 24/84 439/744
5,273,443 A * 12/1993 Frantz .................. H01R 13/424 439/744
7,351,117 B1 * 4/2008 Mostoller ............ H01R 13/506 439/744
2016/0365664 A1 * 12/2016 Chikusa ............... H01R 13/422

FOREIGN PATENT DOCUMENTS

EP 954059 A1 * 11/1999 ......... H01R 13/4223
EP 2701238 A1 * 2/2014 ......... H01R 13/4223

* cited by examiner

*Primary Examiner* — Gary F Paumen

(57) ABSTRACT

A housing includes a dielectric body having a plurality of terminal receiving passageways extending through the dielectric body along a longitudinal direction. The dielectric body has a latch section in which a plurality of walls of the dielectric body that each define one of the terminal receiving passageways are separated from one another by a gap in a lateral direction perpendicular to the longitudinal direction. The walls in the latch section are deflectable toward one another in the lateral direction into the gap.

15 Claims, 8 Drawing Sheets

HOUSING OF AN ELECTRICAL CONNECTOR

FIELD OF THE INVENTION

The present invention relates to an electrical connector and, more particularly, to a housing of an electrical connector.

BACKGROUND

In many electrical connectors, terminals that are connected to wires and matable with mating terminals of a mating connector are secured in a housing. The housing, for example, often has a cantilevered beam that extends into a terminal receiving passageway and resiliently deflects to retain the terminal in the terminal receiving passageway. Terminals can alternatively be press fit into the terminal receiving passageways of the housing.

The cantilevered beam retention or press fitting to hold the terminals in the passageways of the housing does not provide strong or reliable retention; the cantilevered beam cannot resist significant force on the terminal and the press fit, retaining the terminal by friction, can also weaken over time. Other, stronger solutions for retaining terminals in the passageways of a housing require permanent deformation of the housing and limit reuse of the connector.

Further, current housings of connectors do not provide a reliable solution for simultaneously securing multiple terminals, for example terminals connected to wires of a twisted pair cable. A clamshell housing used to simultaneously secure such terminals requires the production of multiple housing pieces and increases the manufacturing cost of the connector.

SUMMARY

A housing includes a dielectric body having a plurality of terminal receiving passageways extending through the dielectric body along a longitudinal direction. The dielectric body has a latch section in which a plurality of walls of the dielectric body that each define one of the terminal receiving passageways are separated from one another by a gap in a lateral direction perpendicular to the longitudinal direction. The walls in the latch section are deflectable toward one another in the lateral direction into the gap.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
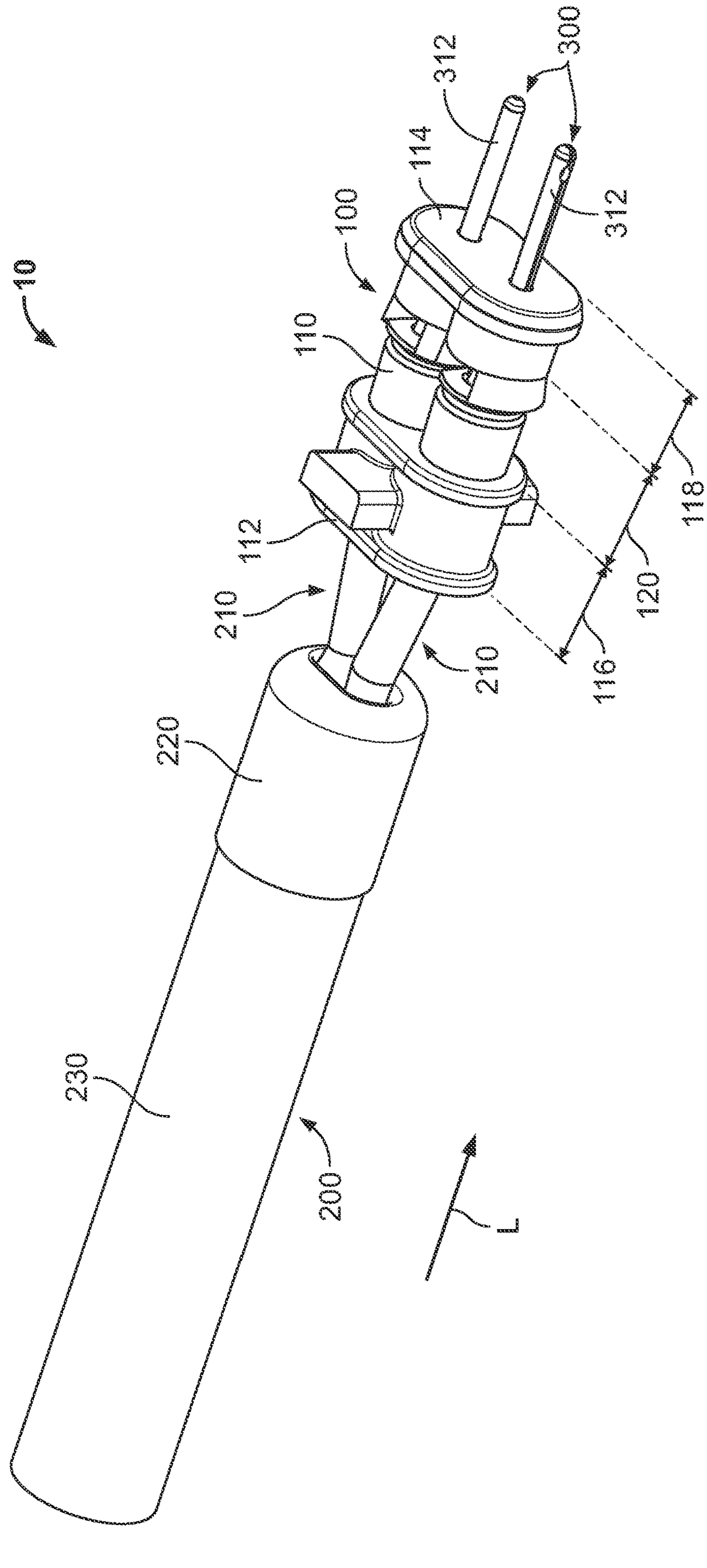
FIG. 1 is a perspective view of a connector according to an embodiment in an assembled state.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth to provide a thorough understanding of the disclosed embodiments. However, it is apparent that one or more embodiments may also be implemented without these specific details.

Throughout the drawings, only one of a plurality of identical elements may be labeled in a figure for clarity of the drawings, but the detailed description of the element herein applies equally to each of the identically appearing elements in the figure.

Throughout the specification, directional descriptors are used such as “longitudinal”, “lateral”, “vertical”, and “radial”. These descriptors are merely for clarity of the description and for differentiation of the various directions. These directional descriptors do not imply or require any particular orientation of the disclosed elements. The “radial” direction is further understood as any direction extending perpendicularly outward from the longitudinal direction; the “lateral” and “vertical” directions, for example, are both also “radial” directions.

A connector 10 according to an embodiment is shown in FIG. 1. The connector 10 includes a housing 100, a cable 200 disposed in the housing 100, and a plurality of terminals 300 held in the housing 100 and connected to the cable 200.

Figure 2:
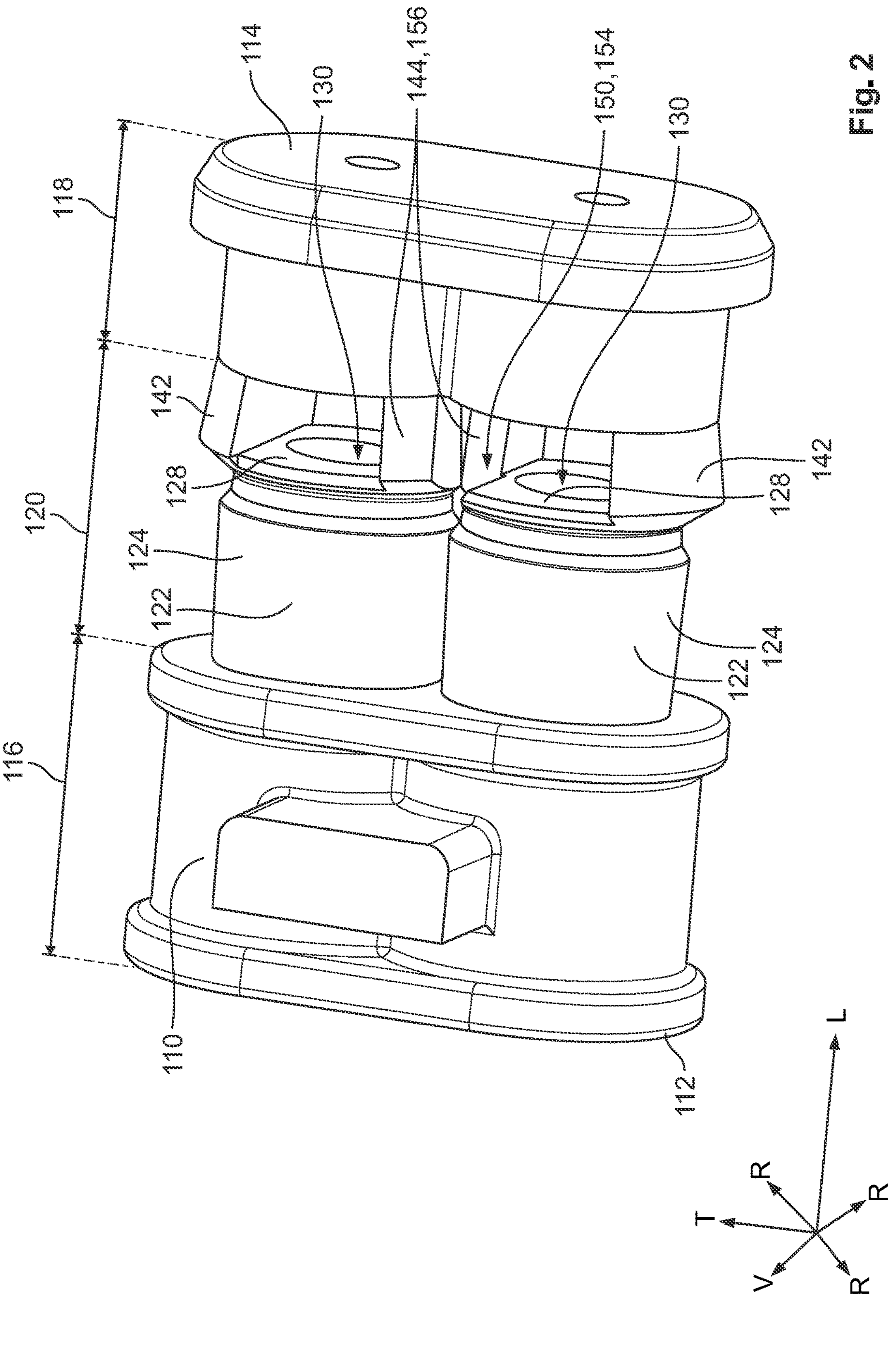
FIG. 2 is a perspective view of a housing of the connector.
Figure 3:
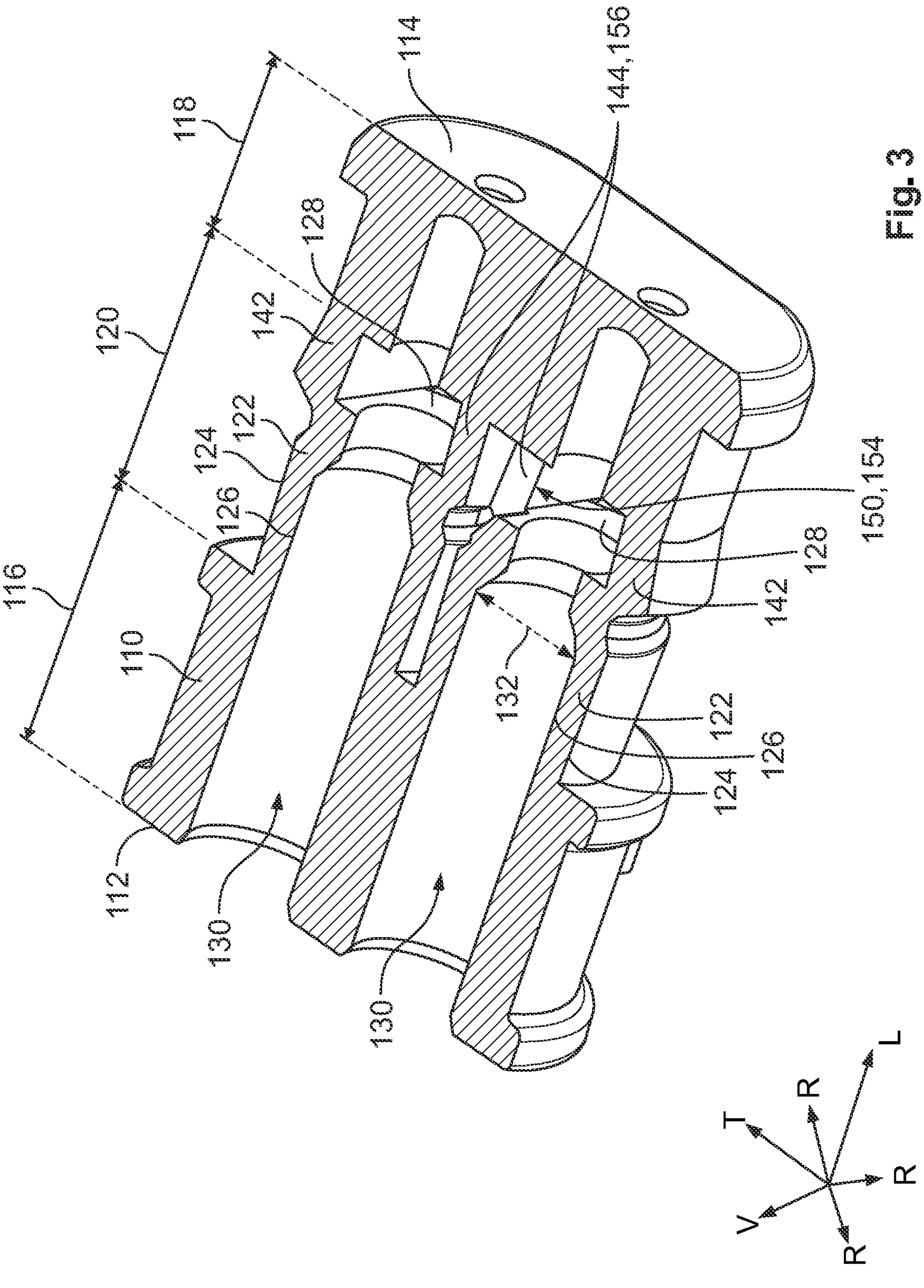
FIG. 3 is a sectional perspective view of the housing.

The housing 100, as shown in FIGS. 1-3, has a dielectric body 110 with a first end 112 and a second end 114 opposite the first end 112 along a longitudinal direction L. The dielectric body 110 has a first section 116 at the first end 112, a second section 118 at the second end 114, and a latch section 120 between the first section 116 and the second section 118. The latch section 120 connects the first section 116 and the second section 118.

Figure 4:
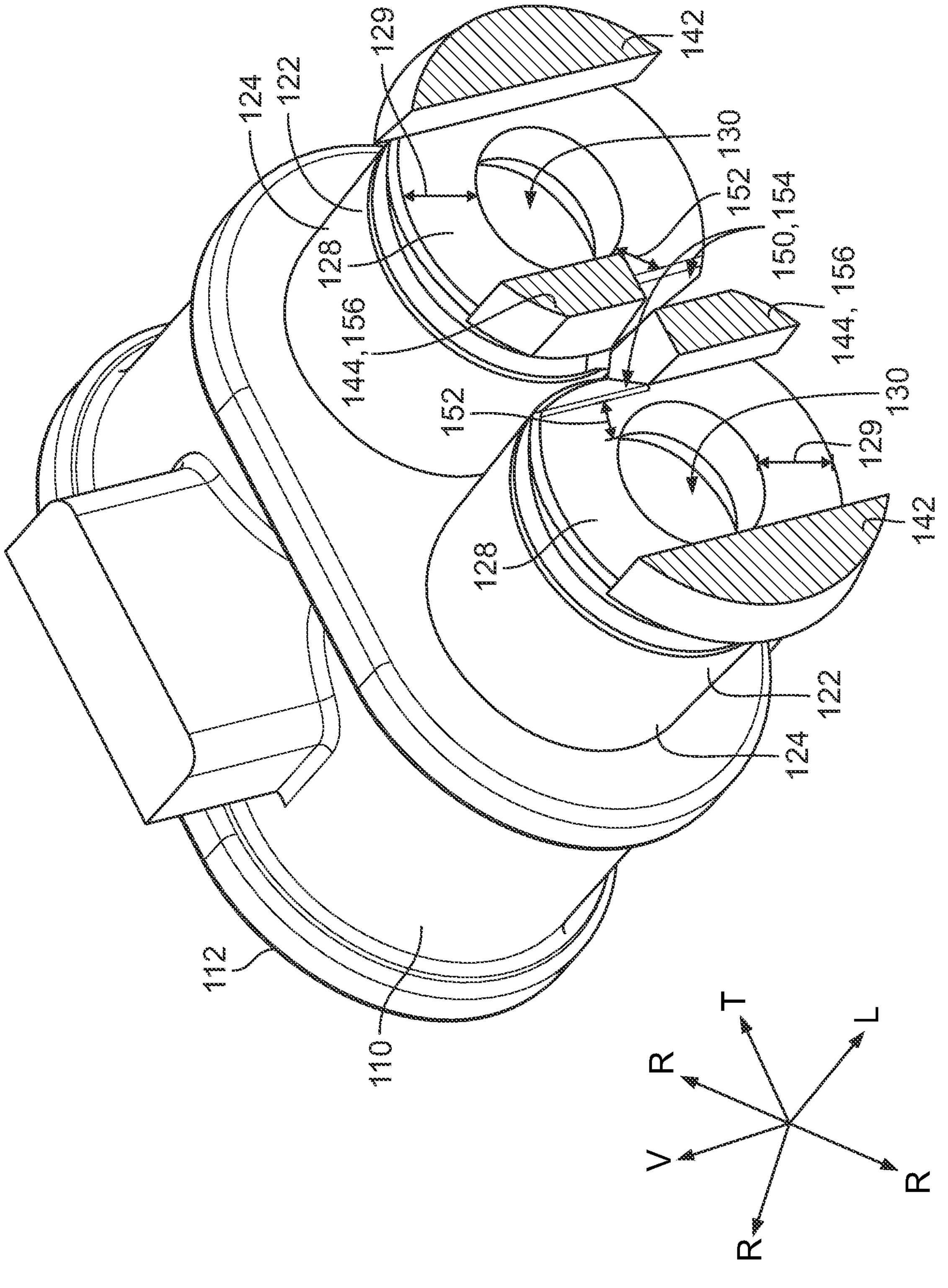
FIG. 4 is another sectional perspective view of the housing.

The housing 100 has a plurality of terminal receiving passageways 130 extending through the dielectric body 110 along the longitudinal direction L, as shown in FIGS. 2-4, from the first end 112 to the second end 114. In the shown embodiment, two terminal receiving passageways 130 extend through the dielectric body 110. In other embodiments, more than two terminal receiving passageways 130 may extend through the dielectric body 110.

As shown in FIGS. 2-4, in the latch section 120, the dielectric body 110 has a plurality of walls 122. Each of the walls 122 defines one of the terminal receiving passageways 130. The walls 122 in the latch section 120 are separate from one another; the walls 122 are not directly connected in the latch section 120, even though the dielectric body 110 forming the walls 122 may be connected in the first section 116 or the second section 118.

The walls 122 each have an outer surface 124 and an inner surface 126 that is opposite to the outer surface 124 along a radial direction R perpendicular to the longitudinal direction L, as shown in FIG. 3. The outer surfaces 124 of the walls 122 are not in contact with one another. In the shown embodiment, the outer surfaces 124 of the walls 122 are spaced apart in a lateral direction T perpendicular to the longitudinal direction L. The inner surfaces 126 of the walls 122 define the terminal receiving passageways 130.

As shown in FIGS. 2-4, the walls 122 in the latch section 120 each have a retention surface 128 perpendicular to the longitudinal direction L. The retention surface 128 extends in a plane normal to the longitudinal direction L and extends circumferentially around the terminal receiving passageway 130. In the shown embodiment, the wall 122 forming the retention surface 128 extends continuously around the terminal receiving passageway 130, entirely enclosing the terminal receiving passageway 130 at the retention surface 128. As shown in FIG. 4, the retention surface 128 has a retention thickness 129 in the radial direction R around a portion of the circumference of the terminal receiving passageway 130. As shown in FIG. 3, a passageway diameter 132 of the terminal receiving passageway 130 decreases along the longitudinal direction L toward the retention surface 128.

In the latch section 120, the walls 122 each have a pair of webs 142, 144 extending from the retention surface 128 along the longitudinal direction L. The webs 142, 144 connect the retention surface 128 to the second section 118 of the dielectric body 110. As shown in FIGS. 2-4, each of the walls 122 has a first web 142 and a second web 144 at the retention surface 128 opposite the first web 142 in the lateral direction T. The second webs 144 are positioned adjacent to one another in the lateral direction T and, in the embodiment shown in FIG. 4, the second webs 144 each have a smaller thickness than the first webs 142 in the lateral direction T, such that the second webs 144 are spaced apart by a gap 125 in the lateral direction T, shown in FIG. 5.

Each of the walls 122 in the latch section 120 has an expansion feature 150, as shown in FIGS. 2-4. The expansion feature 150 includes an expansion recess 154 extending into a portion of the retention surface 128, at which the retention surface 128 has an expansion thickness 152 in the radial direction R that is less than the retention thickness 129, as shown in FIG. 4.

As shown in FIGS. 2-4, the expansion recess 154 of the expansion feature 150 extends into the second web 144 of the pair of webs 142, 144 of each of the walls 122. The expansion recess 154 forms the second web 144 as a partial web 156 adjacent to the portion of the retention surface 128 having the expansion thickness 152. The partial web 156 has a shorter height than the first web 142 in a vertical direction V perpendicular to the longitudinal direction L and the lateral direction T. In the shown embodiment, the partial web 156 is approximately half a height of the first web 142 in the vertical direction V.

The expansion feature 150 of one of the walls 122 in the latch section 120 faces the expansion feature 150 of the other of the walls in the latch section 120 in the lateral direction T, as shown in FIG. 4. The expansion features 150 are positioned adjacent to one another in the lateral direction T. In the shown embodiment, the expansion features 150 are complementary in the lateral direction T; the partial web 156 of each of the walls 122 is aligned with the expansion recess 154 of the other of the walls 122 in the lateral direction T, as shown in FIG. 4, and each of the expansion recesses 154 has a shape complementary to and capable of receiving the partial web 156 of the other wall 122. The shape and arrangement of the partial webs 156 and the expansion recesses 154 of the expansion features 150 are merely exemplary in the shown embodiment. In other embodiments, the partial webs 156 and expansion recesses 154 may have other shapes and arrangements that may be complementary to one another.

Figure 5:
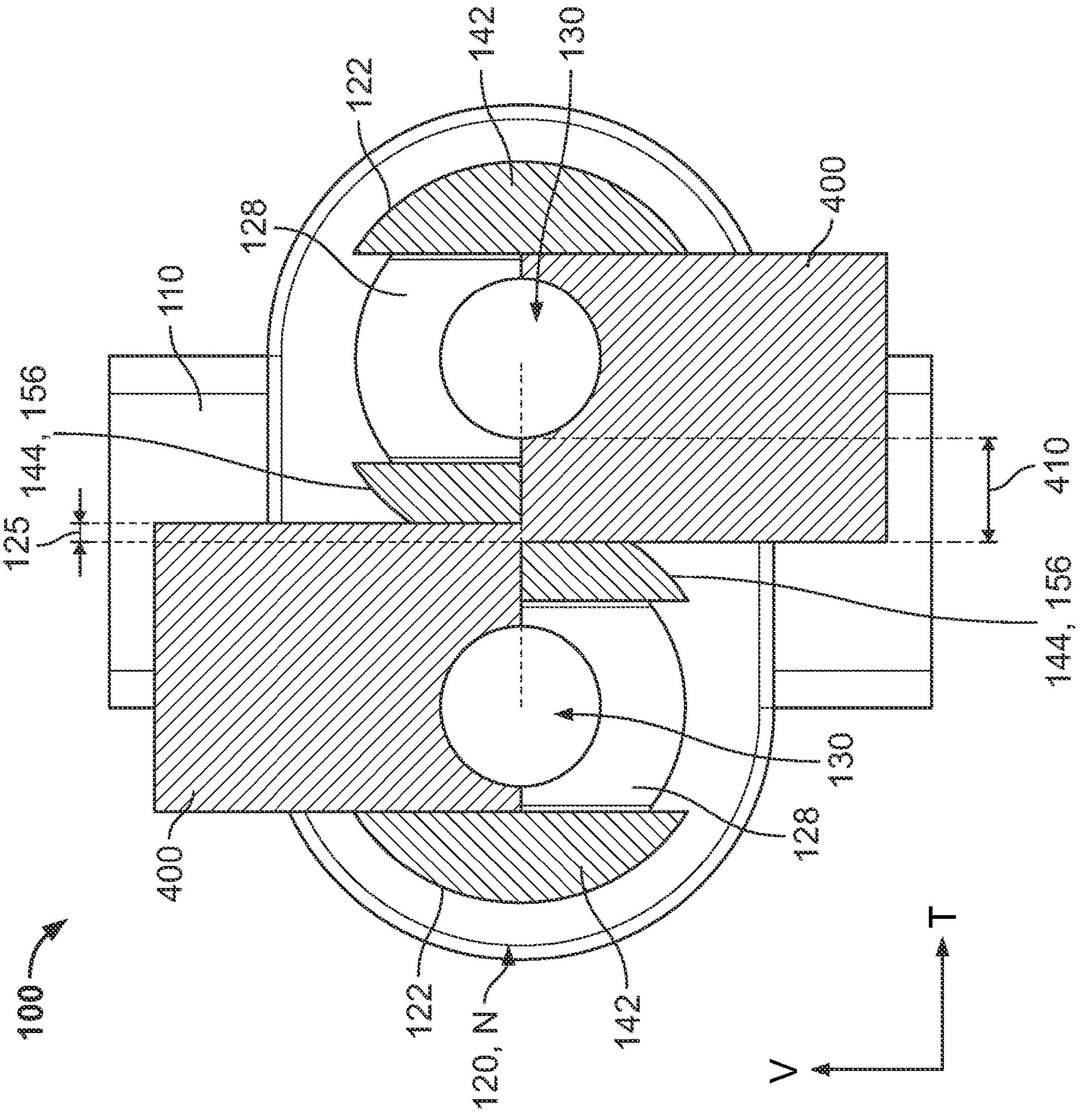
FIG. 5 is a schematic diagram of a molding of the housing.

The dielectric body 110 of the housing 100 is formed of an electrically insulative material, such as a plastic. The dielectric body 110, including the first section 116, the latch section 120, and the second section 118, is monolithically formed in a single piece from the electrically insulative material, for example by injection molding. FIG. 5 shows the latch section 120 of the dielectric body 110 during the molding that forms the housing 100. The latch section 120 is shown in a non-deflected state N in FIG. 5 in which the walls 122 are separated by the gap 125 in the lateral direction T.

As shown in FIG. 5, a bypass tooling 400 is used to mold the expansion features 150 in the latch section 120 with the walls 122 separated by the gap 125. The material of the dielectric body 110 is molded around the bypass tooling 400 to create the latch section 120 with the expansion features 150; removal of the bypass tooling 400 after molding leaves the gap 125 and the expansion recesses 154 described in detail above. The complementary arrangement of the expansion features 150, including the expansion recesses 154 and the partial webs 156, allows thicker and more substantial portions of the bypass tooling 400 to meet at the gap 125 for the molding of the walls 120 and expansion features 150. The bypass tooling 400 has a tooling thickness 410 in portions that meet at the gap 125. The tooling thickness 410 is greater than the thickness of the webs 142, 144 in the lateral direction T, which allows for a more reliable molding of the gap 125 and the expansion features 150 that permit deflection of the walls 122 as described herein.

Figure 6:
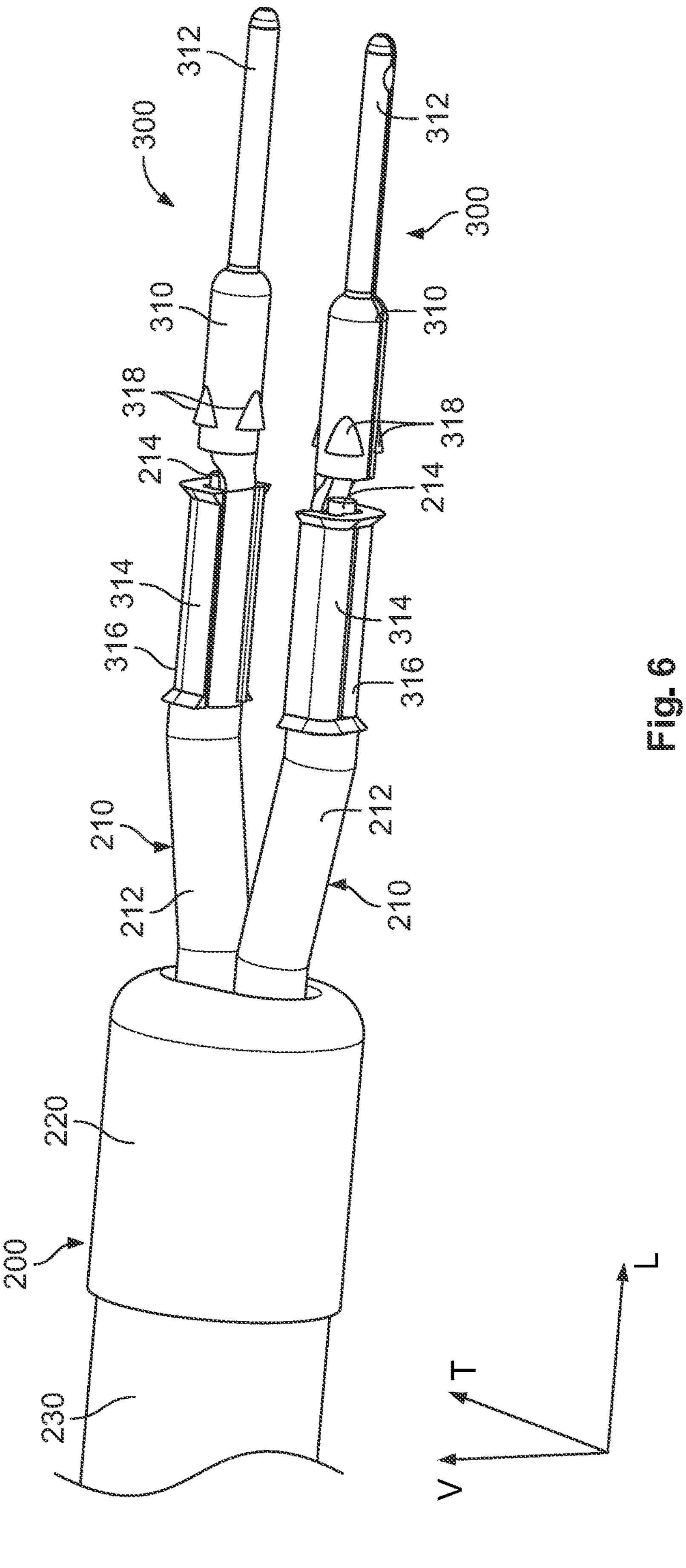
FIG. 6 is a perspective view of a cable and a plurality of terminals of the connector.

The cable 200, as shown in FIGS. 1 and 6, has a twisted pair of wires 210 that can be shielded or unshielded. Each of the wires 210 has a wire insulation 212 surrounding a conductor 214. In the shown embodiment, the cable 200 has a braid 220 formed of a conductive material disposed around the wires 210 and an outer insulation 230 disposed around the braid 220. As shown in FIG. 6, the outer insulation 230 is removed from a portion of the wires 210 and the braid 220 is folded back over a portion of the outer insulation 230 to expose the twisted pair of wires 210. The wires 210 are untwisted in the portion exposed from the outer insulation 230 and the braid 220 and are connected to the terminals 300.

The terminals 300, as shown in FIG. 6, each have a conductive body 310 with a mating end 312 and a connection end 314 opposite the mating end 312 in the longitudinal direction L. The terminals 300 are each electrically and mechanically connected to the conductor 214 of one of the wires 210 at the connection end 314. In the shown embodiment, the connection end 314 of each of the terminals 300 is a pair of crimp wings 316 that are crimped around the conductor 214 of one of the wires 210. In other embodiments, the connecting end 314 may be any type of element that can mechanically and electrically connect to the conductor 214. In the shown embodiment, the mating end 312 of each of the terminals 300 is a pin. In other embodiments, the mating end 312 may be a receptacle or any other type of electrical mating element.

As shown in FIG. 6, the conductive body 310 has a plurality of latch protrusions 318 extending outward from the conductive body 310. The latch protrusions 318, in the shown embodiment, are disposed circumferentially around the conductive body 310 and extend from the conductive body 310 at even intervals. In the shown embodiment, the conductive body 310 has three latch protrusions 318. In other embodiments, the conductive body 310 may have any number of latch protrusions 318.

The insertion of the cable 200 with the terminals 300 connected to the conductors 214, as shown in FIG. 6, into the housing 100 to form the connector 10 will now be described in greater detail primarily with reference to FIGS. 7 and 8.

Each of the terminals 300 connected to one of the wires 210 is inserted into one of the terminal receiving passageways 130 of the housing 100. The terminals 300 are inserted into the housing 100 at the first end 112 of the first section 116 and are moved along the longitudinal direction L toward the second end 114. In an embodiment, the terminals 300, connected to wires 210 of the same cable 200, are simultaneously inserted into the terminal receiving passageways 130.

As the terminals 300 each move along one of the terminal receiving passageways 130, upon entering the latch section 120, the latch protrusions 318 encounter the restricted passageway diameter 132 approaching the retention surface 128 and abut the inner surfaces 126 of the walls 122. As the terminals 300 progress further along the longitudinal direction L, the latch protrusions 318 move along the inner surfaces 126 and deflect the walls 122 outward from the terminal receiving passageways 130 in the radial direction R and into the gap 125.

Figure 7:
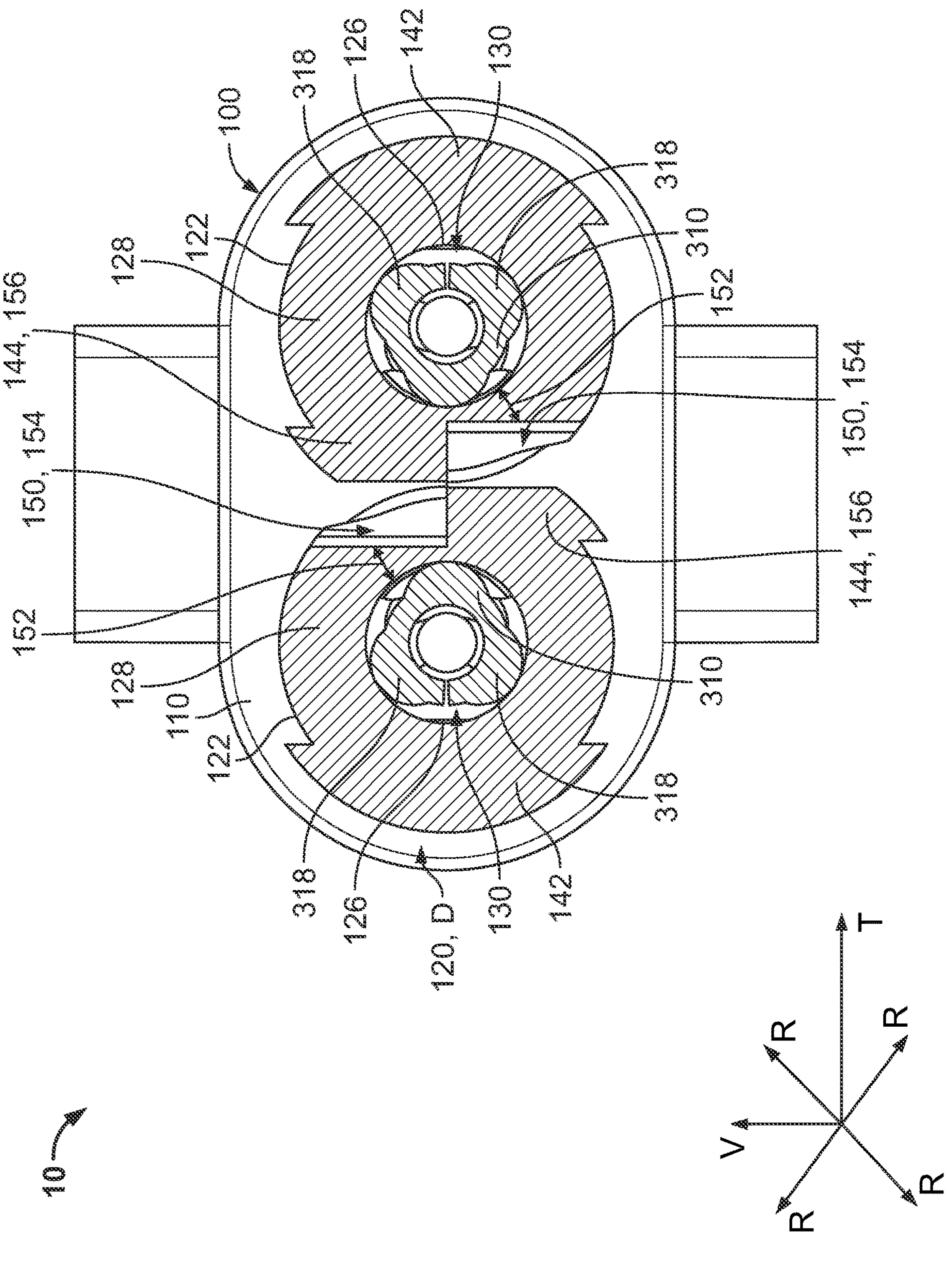
FIG. 7 is a sectional front view of the terminals in the housing of the connector with the housing in a deflected state.

A deflected state D of the walls 122 in the latch section 120 is shown in FIG. 7. The walls 122 are resiliently deflectable outward in the radial direction R despite circumferentially surrounding the terminal receiving passageway 130 at the retention surface 128.

In an embodiment in which the terminals 300 are simultaneously inserted into the terminal receiving passageways 130, the walls 122 in the latch section 120 are simultaneously deflected in the radial direction R, as shown in FIG. 7. In the shown embodiment, the deflection of walls 122 at the complementary expansion features 150 eliminates the gap 125 shown in FIG. 5. In another embodiment, the complementary expansion features 150 permit the walls 122 to overlap in the lateral direction T in the deflected state D, with the partial webs 156 movable into the correspondingly shaped expansion recess 154 of the other wall 122 while the walls 122 remain in the deflected state D.

Figure 8:
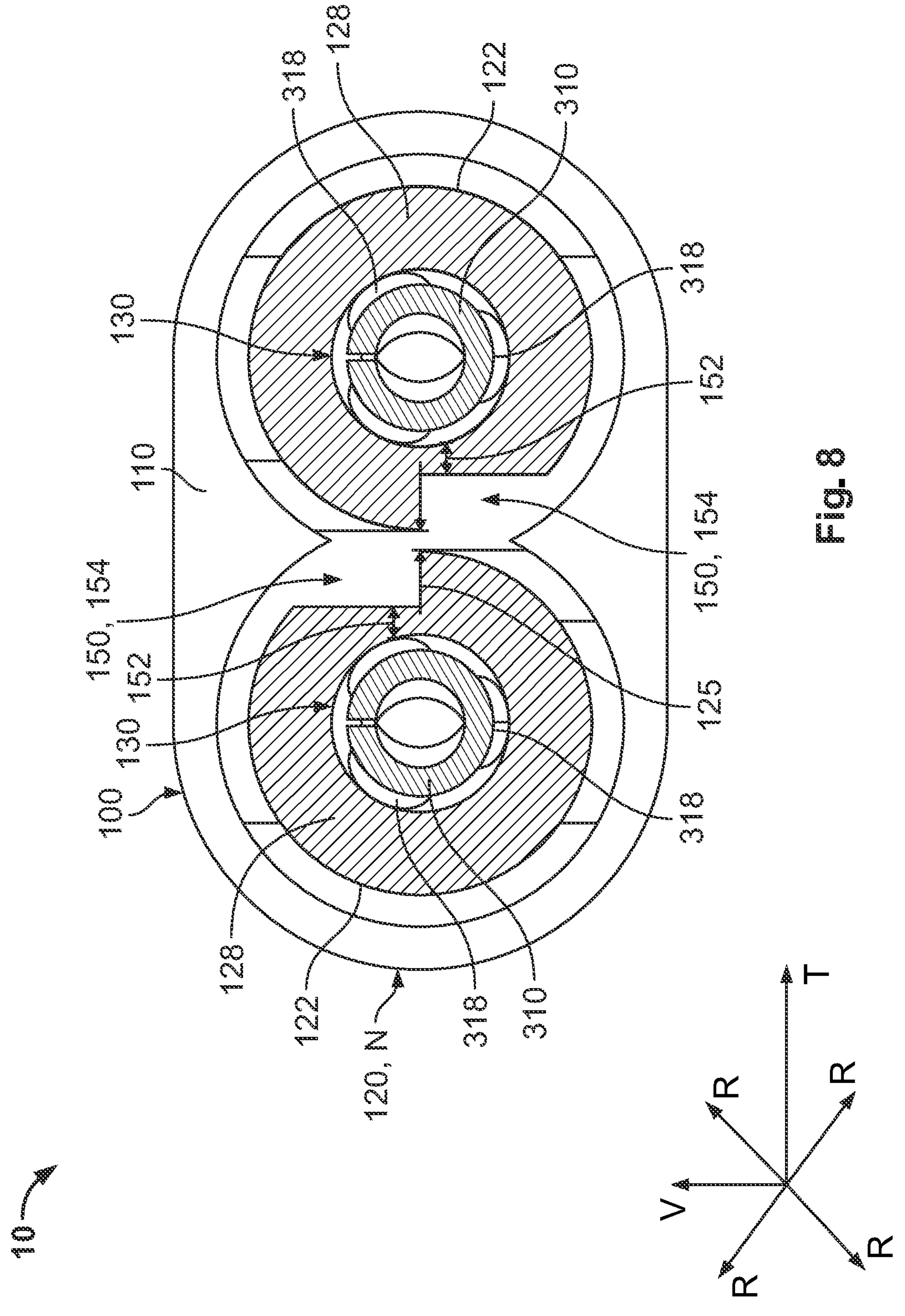
FIG. 8 is a sectional front view of the terminals in the housing of the connector with the housing in a non-deflected state.

When the latch protrusions 318 pass the retention surface 128 as the terminals 300 are inserted into the terminal receiving passageways 130, the walls 122 are no longer deflected by the latch protrusions 318 and the walls 122 in the latch section 120 resiliently return to the non-deflected state N, shown in FIG. 8. In the non-deflected state N, the walls 122 return to separation by the gap 125 in the lateral direction T. The latch protrusions 318 of the terminals 300 engage the retention surface 128 in the non-deflected state N, holding the terminals 300 in the terminal receiving passageways 130 and restricting movement of the terminals 300 in the terminal receiving passageways 130 along the longitudinal direction L. The expansion thickness 152 of the retention surface 128 at the expansion feature 150 is still sufficiently large to provide a surface engageable by each of the latch protrusions 318 to reliably secure the terminal 300 along the longitudinal direction L.

When the terminals 300 connected to the wires 210 of the cable 200 are fully secured in the housing 100 at the retention surfaces 128, the connector 10 is assembled as shown in FIG. 1. The connection ends 314 of the terminals 300 crimped to the wires 210 are disposed in the first section 116 of the housing 100 and the mating ends 312 of the terminals 300 extend out from the second section 118 for mating with a mating connector.

The housing 100 of the connector 10 according to the present invention retains the terminal 300 at the retention surface 128 by the deflection of the walls 122 that define the terminal receiving passageways 130. The expansion features 150 and the gap 125 allow the walls 122 to deflect sufficiently to accommodate the terminals 300 and robustly secure the terminals 300 at the retention surface 128, avoiding the use of a weak cantilevered beam. The complementary design of the expansion features 150 also allows for easier formation of the housing 100 and accommodates simultaneous insertion of terminals 300 without increasing the number of housing 100 parts or production cost.

What is claimed is:

1. A housing, comprising:

a dielectric body having a plurality of terminal receiving passageways extending through the dielectric body along a longitudinal direction, the dielectric body has a latch section in which a plurality of walls of the dielectric body that each define one of the terminal receiving passageways are separated from one another by a gap in a lateral direction perpendicular to the longitudinal direction, the walls are deflectable toward one another in the lateral direction into the gap, the walls in the latch section each have a retention surface perpendicular to the longitudinal direction that extends circumferentially and continuously around the one of the terminal receiving passageways, the walls each have an expansion feature in the latch section, the expansion feature of one of the walls in the latch section faces the expansion feature of the other of the walls in the latch section in the lateral direction, the walls in the latch section each have a pair of webs extending from the retention surface, the expansion feature of each of the walls has an expansion recess forming a partial web in one of the pair of webs.

2. The housing of claim 1, wherein a diameter of each of the terminal receiving passageways decreases along the longitudinal direction toward the retention surface.

3. The housing of claim 1, wherein the expansion features of the walls are complementary in the lateral direction.

4. The housing of claim 1, wherein the partial web of each of walls is aligned with the expansion recess of the other of the walls in the lateral direction.

5. The housing of claim 1, wherein the dielectric body has a first section at a first end and a second section at a second end opposite the first end along the longitudinal direction, the latch section is positioned between and connects the first section and the second section.

6. The housing of claim 5, wherein the dielectric body is monolithically formed in a single piece.

7. A connector, comprising:

a housing including a dielectric body with a plurality of terminal receiving passageways extending through the dielectric body along a longitudinal direction, the dielectric body has a latch section in which a plurality of walls of the dielectric body that each define one of the terminal receiving passageways are separated from one another by a gap in a lateral direction perpendicular to the longitudinal direction, the walls are deflectable toward one another in the lateral direction into the gap, the walls in the latch section each have a retention surface perpendicular to the longitudinal direction that extends circumferentially and continuously around the one of the terminal receiving passageways, the walls each have an expansion feature in the latch section, the expansion feature of one of the walls in the latch section faces the expansion feature of the other of the walls in the latch section in the lateral direction, the walls in the latch section each have a pair of webs extending from the retention surface, the expansion feature of each of the walls has an expansion recess forming a partial web in one of the pair of webs; and a plurality of terminals each held in one of the terminal receiving passageways.

8. The connector of claim 7, wherein each of the terminals has a conductive body with a latch protrusion extending outward from the conductive body, the latch protrusion engages the retention surface.

9. The connector of claim 8, wherein the latch protrusion deflects the wall outward from the terminal receiving passageway in a radial direction perpendicular to the longitudinal direction during insertion of each of the terminals into the terminal receiving passageways.

10. The connector of claim 7, wherein the dielectric body has a first section at a first end and a second section at a second end opposite the first end along the longitudinal direction, the latch section is positioned between and connects the first section and the second section.

11. The connector of claim 10, wherein each of the terminals has a conductive body with a mating end and a connection end opposite the mating end, the connection end is disposed in the first section and the mating end extends out from the second section.

12. The connector of claim 7, further comprising a cable including a pair of wires each having a conductor and a wire insulation disposed around the conductor, the conductor of each of the wires is electrically and mechanically connected to one of the terminals.

13. A method of retaining a plurality of terminals in a housing, comprising:

providing a housing including a dielectric body having a plurality of terminal receiving passageways extending through the dielectric body along a longitudinal direction, the dielectric body has a latch section in which a plurality of walls of the dielectric body that each define one of the terminal receiving passageways are separated from one another by a gap in a lateral direction perpendicular to the longitudinal direction, the walls in the latch section each have a retention surface perpendicular to the longitudinal direction that extends circumferentially and continuously around the one of the terminal receiving passageways, the walls each have an expansion feature in the latch section, the expansion feature of one of the walls in the latch section faces the expansion feature of the other of the walls in the latch section in the lateral direction, the walls in the latch section each have a pair of webs extending from the retention surface, the expansion feature of each of the walls has an expansion recess forming a partial web in one of the pair of webs; and inserting a plurality of terminals into the terminal receiving passageways, the terminals deflect the walls during insertion into the gap and the terminals are each held in one of the terminal receiving passageways at the retention surface.

14. The method of claim 13, wherein the terminals are simultaneously inserted into the terminal receiving passageways and the walls are simultaneously deflected.

15. The method of claim 13, further comprising forming the housing by injection molding, the expansion features of the walls and the gap between the walls are formed by a bypass tooling in the injection molding.

* * * * *